ately fasten the adjustable plate

United States Patent

Bruck

[15] 3,688,323

[45] Sept. 5, 1972

[54] APPARATUS FOR CHASING AND REPAIRING THREADS

[72] Inventor: Robert F. Bruck, 400 North St., P.O. Box 69, Logansport, Ind. 46947

[22] Filed: Sept. 4, 1970

[21] Appl. No.: 69,732

[52] U.S. Cl. ..................10/1 B, 10/101, 10/111, 10/123
[51] Int. Cl. ....................B23g 1/26, B23g 5/00
[58] Field of Search......10/1 B, 101, 101 P, 102, 111, 10/123, 123 P; 72/703; 82/4 C, 4 D, 4 R; 408/215, 218; 30/94

[56] References Cited

UNITED STATES PATENTS

| 669,866 | 3/1901 | Thomas | 30/94 |
|---|---|---|---|
| 1,244,874 | 10/1917 | Loughridge et al. | 30/94 |
| 1,491,847 | 4/1924 | Creed | 10/1 B |
| 1,754,489 | 4/1930 | Stevenson | 10/1 B |
| 2,388,790 | 11/1945 | Mackliet | 10/1 B |
| 2,508,291 | 5/1950 | Porro | 10/1 B |
| 1,510,611 | 10/1924 | Schang | 30/94 |

FOREIGN PATENTS OR APPLICATIONS

| 59,320 | 5/1938 | Norway | 10/1 B |
|---|---|---|---|
| 294,892 | 1/1914 | Germany | 30/94 |
| 1,280,771 | 11/1960 | France | 10/123 |

*Primary Examiner*—Charles W. Lanham
*Assistant Examiner*—E. M. Combs
*Attorney*—Woodard, Weikart, Emhardt & Naughton

[57] ABSTRACT

An apparatus for repairing damaged threads on a shaft, rod or other similar member. An adjustable plate, a cutter support block and a pressure block are slideably mounted to a rod. Fasteners securely fasten the adjustable plate and the support block to the rod whereas the pressure block is loosely mounted to the rod. The support block is suspended from the adjustable plate by a wing bolt threadedly received in the adjustable plate with an end seating in the pressure block. A V-shaped pressure plate is fixedly fastened to the pressure block cradling the top of the threaded member to be repaired. A chaser having a cutting edge matched to the threads of the member to be repaired is mounted to the support block beneath the pressure plate. A thread support is mounted to the support block having an angular end abutting the member to be repaired.

5 Claims, 4 Drawing Figures

PATENTED SEP 5 1972

3,688,323

INVENTOR.
ROBERT F. BRUCK
BY
Woodard, Weikart, Emhardt & Naughton
ATTORNEYS 3,688,323

APPARATUS FOR CHASING AND REPAIRING THREADS

BACKGROUND OF THE INVENTION

1. Field of the Invention

This invention is a tool apparatus for repairing damaged threads.

2. Description of the Prior Art

External threads on a shaft, rod or other similar member may be damaged by a sudden blow of an instrument thereby rendering the threaded shaft, rod or member useless. The typical solution is to replace the damaged part with a new part. An alternate solution is to repair or re-cut the damaged threads. This latter solution usually requires fairly expensive and complex equipment which is operable only by skilled tradesmen. At least three U.S. Patents disclose such equipment: U.S. Pat. Nos. 2,023,440 issued to Reimschissel, 2,093,506 issued to Bartek, and 2,711,548 issued to Reimschissel. In many cases, the equipment must be completely disassembled in order to remove the damaged part to replace it or to re-cut the threads. All of this results in a large expense and time delay.

From the above background, it can be seen that there is a need for an inexpensive device which is operable to quickly repair and re-cut the damaged threads on a shaft, rod or other similar member. It is desirable for the apparatus to be operable without requiring a skilled tradesman. It is also desirable that the apparatus be operable without requiring the removal of the damaged part from its associated equipment. In addition, it is desirable for the apparatus to be portable, light weight and operable on the job site.

SUMMARY OF THE INVENTION

This invention is an apparatus for repairing and re-cutting damaged threads on a shaft, rod or other similar member. An adjustable plate is slidably mounted to a rod at one end with a wing bolt threadedly received in its opposite end. A pressure block is slidably mounted to the rod having a seat receiving the unthreaded necked down end of the wing bolt. A V-shaped pressure plate is fixedly fastened to the bottom side of the pressure block. A support block is slidably mounted to the rod with a chaser having a cutting edge mounted to it for engaging the damaged threads of the member to be repaired. A thread support is mounted to the support block with a smooth angular end for supporting the member to be repaired. The support block and adjustable plate have means to prevent relative motion between them and the rod.

It is an object of the present invention to provide a device for repairing and re-cutting damaged threads on a rod or shaft in a very quick and inexpensive manner.

It is an additional object of the present invention to provide a device to repair and re-cut damaged threads on a rod without requiring the removal of the damaged rod from its associated equipment.

In addition, it is an object of the present invention to provide a thread chaser which is inexpensive, light weight and of such a size that it may be easily carried to the job site.

Related objects and advantages of the present invention will be apparent from the following description.

DESCRIPTION OF THE PREFERRED EMBODIMENT

Figure 1:
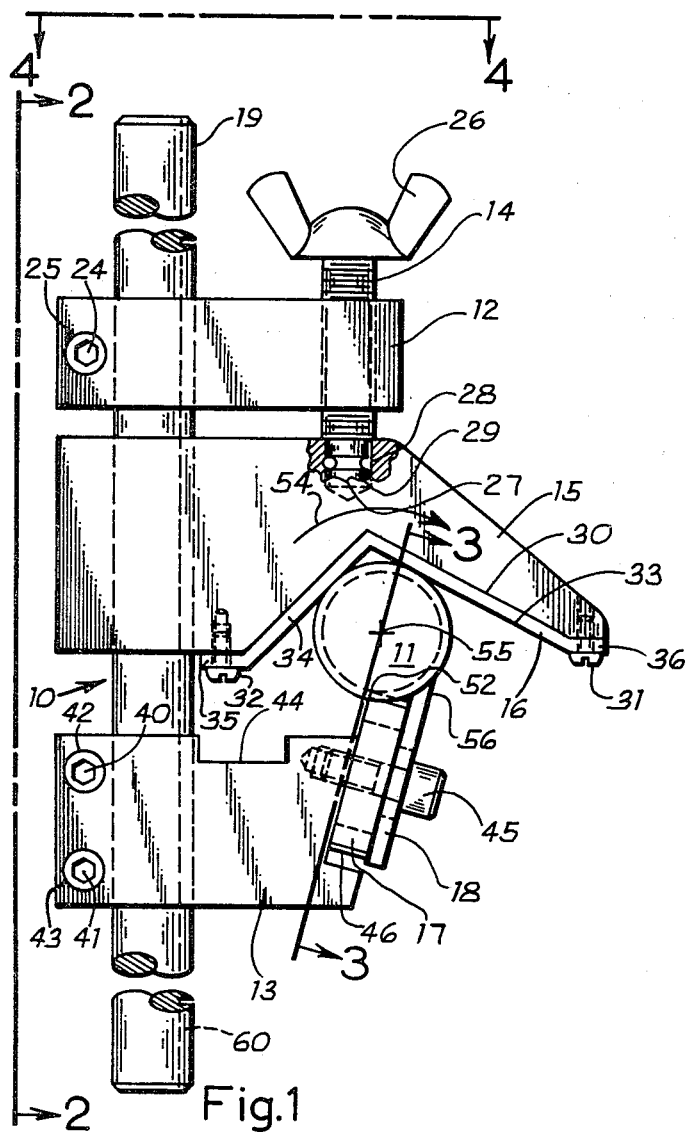
FIG. 1 is a fragmentary side view of the thread chaser incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is illustrated thread chaser 10 engaged with bolt 11. Thread chaser 10 is a maintenance tool for use in re-cutting threads on bolts where the thread has been flattened or knocked out of line. Thread chaser 10 may be used while bolt 11 protrudes out of its associated equipment. By rotating the thread chaser around the bolt to be repaired, the threads on the bolt are thereby recut.

Figure 2:
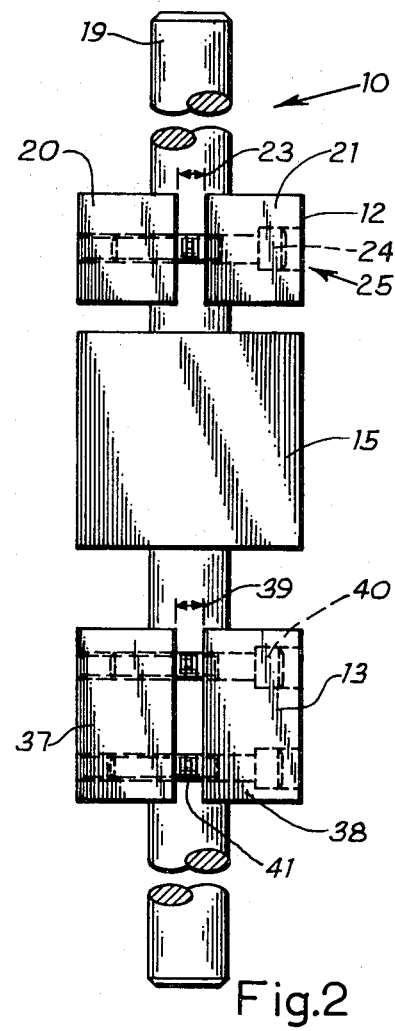
FIG. 2 is an end view of the device shown in FIG. 1 viewed in the direction of arrows 2—2.

FIG. 2 is an end view of the thread chaser shown in FIG. 1 viewed in the direction of arrows 2—2. As shown in FIGS. 1 and 2, thread chaser 10 has an adjusting plate 12, an adjustable pressure block 15, and a pressure plate 13 mounted to rod 19. Plate 12 has a hole through it for slidingly receiving rod 19. Two outwardly disposed ears 20 and 21 are integrally attached to plate 12 being spaced apart forming gap 23 and connected by fastener 24, such as a socket head cap screw. Fastener 24 extends freely through ear 21 being threadedly received by ear 20. The head of the fastener is positioned in a recess or counterbore 25 provided in the outside surface of ear 21. The user adjusts plate 12 with respect to rod 19 and then tightens fastener 24 preventing relative motion between plate 12 and rod 19. Threadedly received in the opposite end of plate 12 is a wing bolt 14 having a head 26 integrally attached thereto. The opposite end of bolt 14 is necked down forming a smaller diametered portion 29 received by hole 28 of adjustable pressure block 15. Block 15 is cut away at location 27 to more clearly illustrate that portion 29 rotatably fits into hole 28.

Adjustable pressure block 15 has a V-shaped cut-out 30 provided at its bottom for receiving pressure plate 16. Fasteners 31 and 32 are threadedly received by pressure block 15 securing respectively flanges 36 and 35 of plate 16 to block 15. Flange 36 is integrally attached to side 33 of plate 16 whereas flange 35 is integrally attached to side 34 of plate 16. Sides 33 and 34 are integrally attached defining an included angle greater than 90° but less than 180°. As shown in FIG. 1, plate 16 is complementary in configuration to cut-out 30. Adjustable pressure block 15 slidingly receives rod 19 and may be adjusted along the length of rod 19 by wing bolt 14.

Mounted to rod 19 beneath adjustable pressure plate 15 is cutter support block 13. Block 13 is mounted to rod 19 in a manner similar to the mounting of plate 12 to rod 19. Block 13 has two outwardly disposed ears 37 and 38 spaced apart forming gap 39. Fasteners 40 and 41 extend freely through ear 38 being threadedly received into ear 37. Fasteners 40 and 41 are socket head cap screws and have heads positioned in counterbores 42 and 43 provided in the outside surface of ear 38. Block 13 may be adjusted with respect to rod 19 and then tightened in place by securing fasteners 40 and 41. A cut out 44 is provided in the top surface of block 13 so as to prevent interference between block 13 and flange 35, fastener 32, and the lower portion of side 34 of pressure plate 16. Mounted to the end of block 13 beneath pressure plate 16 is hardened chaser 17 and key way thread support 18. Fastener 45 secures key way thread support 18 and chaser 17 to block 13. Fastener 45 is threadedly received into block 13 and extends freely through chaser 17 and support 18. Block 13 has a recess 46 for receiving chaser 17.

Figure 3:
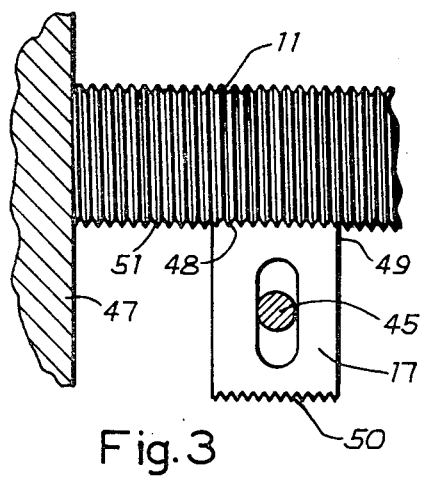
FIG. 3 is a sectional view taken along the line 3—3 of FIG. 1 and viewed in the direction of the arrows showing the chaser threadedly engaged with a bolt.

FIG. 3 is a sectional view taken along line 3—3 and viewed in the direction of the arrows, showing chaser 17 engaged with bolt 11. Chaser 17 having fastener 45 extending through a slot positioned about its center has a top end 49 and bottom end 50 with grooves provided on each. These grooves follow the exact shape and path of the existing threads on bolt 11 and cut away any battered sides of the existing threads on bolt 11. That is, grooves 48 provided in top end 49 are threadedly engaged with threads 51 of bolt 11. It can be appreciated that the threads of a damaged bolt may be many different sizes. For example, threads 51 may be cut for four threads per inch, eight threads per inch, or even 16 threads per inch. Thus, chaser 17 is provided with grooves at both its top end and bottom end for use with different threaded bolts. In addition, thread chaser 10 is provided with more than one chaser 17, in order that the proper thread chaser may be selected for use with the damaged bolt. For example, five chasers 17 may be provided with thread chaser 10, each having grooves at their top and bottom ends for engaging differently threaded bolts. One chaser 17 may be engageable with a bolt having 10 threads per inch on its top end and eight threads per inch on its bottom end, whereas another chaser 17 may have a top end engageable with a bolt having six threads per inch and a bottom end engageable with a bolt having four threads per inch. As may be seen from FIG. 1, only a portion of the grooved top side 49 of chaser 17 engages bolt 11. Cutting edge 52 of chaser 17 is located directly under the junction of side 34 and 33, being disposed between rod 19 and the center 55 of bolt 11. Thread support 18 has an angular smooth top end 56 abutting against and supporting bolt 11.

Figure 4:
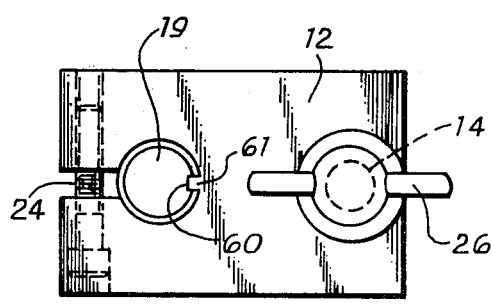
FIG. 4 is a top view of the thread chaser of FIG. 1 viewed in the direction of arrows 4—4.

FIG. 4 is a top view of thread chaser 10 of FIG. 1 viewed in the direction of arrows 4—4. Rod 19 has a keyway 60 extending its length receiving key 61 of plate 12. Although not shown in FIG. 4, blocks 15 and 13 also have keys projecting into slot 60. The arrangement of the keyway and slots insure that plate 12 and blocks 15 and 13 are always aligned.

Thread chaser 10 may be made from many materials; however, best results have been obtained by producing support 18 and plate 16 from brass. The remaining components are made from machined steel. In addition, rod 19 is case hardened. To operate thread chaser 10, the damaged bolt 11 should be cradled between sides 33 and 34 of plate 16. Therefore, block 13 and block 15 should be spaced apart, allowing the bolt to protrude between the blocks. Fasteners 24, 40 and 41 should be tightened to prevent relative motion between rod 19 and block 13 and plate 12. Wing head 26 should then be rotated until block 15 abuts bolt 11 on the top and chaser 17 and support 18 abut bolt 11 on the bottom. Of course, prior to inserting bolt 11 in the thread chaser, the bolt has been gauged to determine the number of threads per inch and the proper chaser 17 has been selected corresponding to the threads on bolt 11. The appropriate chaser 17 and support 18 are secured to block 13 by fastener 45. Once grooves 48 have engaged threads 51 of bolt 11, thread chaser 10 should be rotated about the longitudinal axis of bolt 11 in the direction of arrow 54 thereby eventually engaging and repairing the damaged threads. Either end of rod 19 may be grasped by the hand to rotate thread chaser 10 about bolt 11. Thread chaser 10 may be provided with a long or short arm 19, depending upon the access space in which the user has to rotate the thread chaser. Obviously, the longer rod 19 extends from bolt 11, the more leverage the user may be able to exert on the thread chaser; however, in many cases it will not be possible to have a long rod, and thus a short rod may be preferable. Rod 19 may be adjusted with respect to plate 12 and block 13 so that it may be grasped at either end.

Thread chaser 10 is provided in kit form, with multiple chasers furnished with the device. The chaser picked is determined by checking existing threads on bolt 11 with a thread gauge. Thread chaser 10 may be set and used to complete the repair job in a matter of minutes, whereas the prior methods required an hour or more to accomplish. Thread chaser 10 is used only as a maintenance tool for renewing the battered and worn threads. In one embodiment of thread chaser 10, it was adjustable to receive a threaded shaft from three-fourths of an inch to 4 inches in diameter. The same embodiment took from 1 to 5 minutes for conversion from the ¾-inch diameter capability to the 4 inch diameter capability. In a sense, thread chaser 10 "chases" the battered threads away quickly in a few minutes, or in a "jiffy."

It will be obvious from the above description that the present invention provides a device for repairing and recutting damaged threads on a rod or shaft very quickly and inexpensively. It will be further obvious from the above description, that the present invention provides a device to repair and recut damaged threads on axles, shafts, piston rods, and other similar members 11 (FIG. 3) without removing them from their associated machine or equipment 47. In addition, it will be obvious from the above description that the present thread chaser is lightweight, inexpensive and which may be carried to the job site.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A thread chaser for repairing external threads on a shaft comprising:
    a rod spaced from and nonperpendicularly arranged with respect to said shaft;
    a bottom support block slidably mounted to said rod with said rod projecting therethrough;
    a cutting tool configured as a plate and removably mounted to said bottom support block and engageable with said threads;
    a key way thread support plate mounted adjacent said cutting tool and to said bottom support block and having a smooth end abutting said shaft at a location on said shaft different from said cutting tool preventing said cutting tool from entering any keyway on said shaft;
    a pressure block slidably mounted to said rod and having an inverted V-shaped bottom side retaining said shaft, said pressure block being adjustable to and from said cutting tool with said rod projecting through said pressure block; and, wherein said cutting tool has a cutting edge located directly under the vertex of said V-shaped bottom of said pressure block and between said rod and the center of said shaft.

2. The chaser of claim 1 additionally comprising:
    a top plate slidably mounted to said rod with said rod projecting therethrough; and,
    a wing bolt threadedly extending through said top plate having a bottom unthreaded end abutting said pressure block and wherein:
    said cutting tool is a plate angularly and non-perpendicularly positioned with respect to said shaft 3. The chaser of claim 2 wherein:
    said cutting tool has parallel grooves sized to threadedly engage said threads.

4. The chaser of claim 3 additionally comprising:
    a brass pressure plate fixedly mounted to said bottom of said pressure block and being complementary in shape to said V-shaped bottom of said pressure block.

5. The chaser of claim 4 wherein:
    said rod has a keyway slot extending its length; and,
    said top plate, said pressure block and said bottom support block each have a key protruding into said keyway slot so as to maintain alignment of said top plate, said pressure block and said bottom support block.

* * * * *